(12) United States Patent
Sawai

(10) Patent No.: US 9,897,128 B2
(45) Date of Patent: Feb. 20, 2018

(54) PART FITTED WITH FASTENING MEMBER, AND METHOD OF ATTACHING THE SAME

(71) Applicant: Yazaki Corporation, Tokyo (JP)

(72) Inventor: Masayoshi Sawai, Makinohara (JP)

(73) Assignee: Yazaki Corporation, Tokyo (JP)

( * ) Notice: Subject to any disclaimer, the term of this patent is extended or adjusted under 35 U.S.C. 154(b) by 52 days.

(21) Appl. No.: 15/131,384

(22) Filed: Apr. 18, 2016

(65) Prior Publication Data

US 2016/0230800 A1 Aug. 11, 2016

Related U.S. Application Data

(63) Continuation of application No. PCT/JP2014/080729, filed on Nov. 20, 2014.

(30) Foreign Application Priority Data

Nov. 22, 2013 (JP) .................................. 2013-241610

(51) Int. Cl.
*F16B 37/04* (2006.01)
*F16B 33/00* (2006.01)
(Continued)

(52) U.S. Cl.
CPC ............ *F16B 33/002* (2013.01); *F16B 37/04* (2013.01); *F16B 37/067* (2013.01); *H01R 4/34* (2013.01);
(Continued)

(58) Field of Classification Search
CPC ...... F16B 33/002; F16B 37/04; F16B 37/065; F16B 37/067; H01R 4/06; H01R 4/34; H01R 4/64
(Continued)

(56) References Cited

U.S. PATENT DOCUMENTS

| 2,188,422 | A | * | 1/1940 | Waner | .................. | F16B 37/067 |
| | | | | | | 411/34 |
| 2,763,314 | A | * | 9/1956 | Gill | ....................... | F16B 33/002 |
| | | | | | | 29/509 |

(Continued)

FOREIGN PATENT DOCUMENTS

| JP | H0415309 A | 1/1992 |
| JP | 05-033108 A | 2/1993 |

(Continued)

OTHER PUBLICATIONS

International Search Report dated Jan. 13, 2015, issued for PCT/JP2014/080729.

(Continued)

*Primary Examiner* — Roberta S Delisle
(74) *Attorney, Agent, or Firm* — Locke Lord LLP

(57) ABSTRACT

An object of the invention is to resolve the inconvenience of separately handling a nut member and a bolt member and improve workability in fastening and fixing a part. There is adopted a part fitted with a fastening member including: one fastening member that includes a high-rigidity screw portion, a low-rigidity crushable portion, and a locking portion provided against a member to which a part is attached; another fastening member that includes a screw portion tightly screwed with the high-rigidity screw portion to be able to crush the crushable portion; and a part that is temporarily fastened and held between the one fastening member and the other fastening member while the two screw portions are loosely screwed together.

4 Claims, 4 Drawing Sheets

(51) Int. Cl.
*H01R 4/34* (2006.01)
*H01R 4/38* (2006.01)
*F16B 37/06* (2006.01)
*H01R 4/06* (2006.01)
*H01R 4/64* (2006.01)

(52) U.S. Cl.
CPC ............... *H01R 4/38* (2013.01); *H01R 4/06* (2013.01); *H01R 4/64* (2013.01)

(58) Field of Classification Search
USPC .......................................... 411/172, 176, 183
See application file for complete search history.

(56) References Cited

U.S. PATENT DOCUMENTS

| | | | | |
|---|---|---|---|---|
| 5,259,713 | A | * | 11/1993 | Renner ............... B25B 27/0007 411/183 |
| 5,294,223 | A | * | 3/1994 | Phillips, II ............ F16B 37/067 411/113 |
| 5,403,135 | A | * | 4/1995 | Renner ............... B25B 27/0007 29/525.06 |
| 5,997,341 | A | | 12/1999 | Ushiyama et al. |
| 6,712,573 | B1 | | 3/2004 | Huber |
| 6,761,520 | B1 | * | 7/2004 | Dise ...................... F16B 33/002 411/113 |
| 7,223,056 | B2 | * | 5/2007 | Schneider ............. F16B 37/067 411/183 |
| 8,226,339 | B2 | * | 7/2012 | Neri ...................... F16B 37/067 411/161 |
| 2002/0002768 | A1 | * | 1/2002 | Roser ..................... F16B 19/10 29/423 |
| 2006/0291974 | A1 | * | 12/2006 | McGee ............... B25B 27/0014 411/171 |

FOREIGN PATENT DOCUMENTS

| | | |
|---|---|---|
| JP | H07016018 U | 3/1995 |
| JP | 11-31545 A | 2/1999 |
| JP | 2003514196 A | 4/2003 |

OTHER PUBLICATIONS

Notification of Reasons for Refusal dated Sep. 26, 2017 issued for corresponding Japanese Patent Application No. 2013-241610.

* cited by examiner

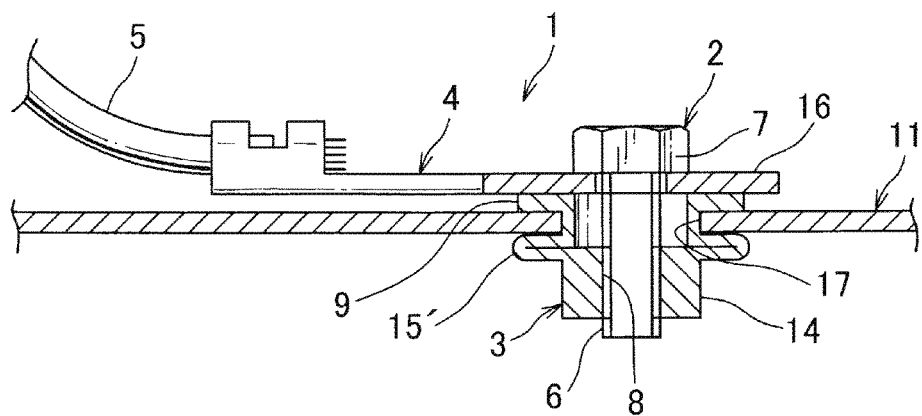
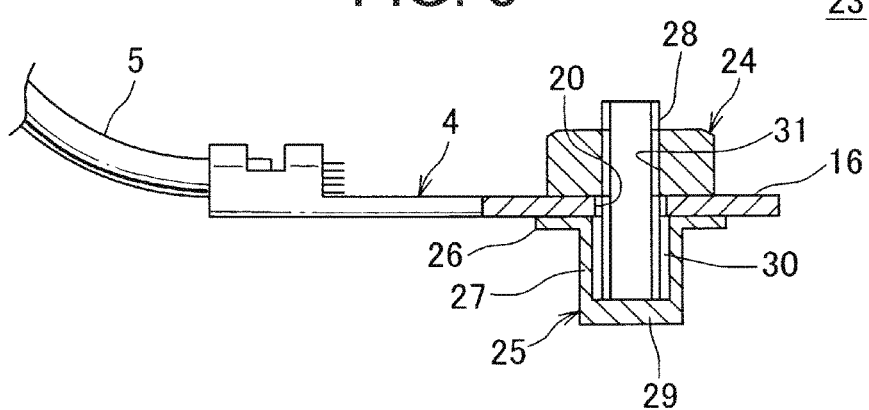
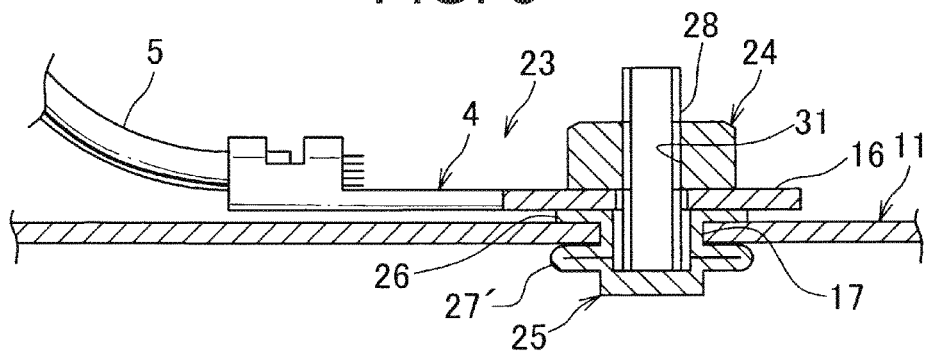

PART FITTED WITH FASTENING MEMBER, AND METHOD OF ATTACHING THE SAME

TECHNICAL FIELD

The present invention relates to a part fitted with a fastening member and a method of attaching the part, where the part is a terminal, a bracket or the like that is attached to the other end with use of a bolt and a nut crushing into the shape of a flange by a screw fastening operation.

BACKGROUND ART

Patent Literature 1 discloses a terminal fitted with a nut as a conventional example where a fastening member is provided integrally with a terminal fitted with an electric wire to improve fastening workability.

The terminal fitted with a nut (not shown) includes a plate-like electrical contact portion having a screw insertion hole, an electric wire connecting (crimping) portion contiguous to the electrical contact portion, a plurality of guide lugs erected and formed on the rim of the electrical contact portion, and a nut member supported to be freely turned along the surface of the electrical contact portion by the plurality of guide lugs.

A bolt is erected in a connecting portion on the other end so that the bolt is inserted through the screw insertion hole of the electrical contact portion of the terminal fitted with a nut to be screwed into the nut, and the electrical contact portion of the terminal fitted with a nut is brought into contact with and fixed to the connecting portion on the other end.

Besides the terminal fitted with a nut (part fitted with a fastening member), Patent Literature 2 discloses an example where a nut member made of an Al alloy formed of a flange portion, a thin swage cylinder, and a thick screw cylinder is inserted into an attachment hole on a board (panel) of a vehicle body, the flange portion is brought into contact with the surface of the board, the swage cylinder is compressed in its axial direction by a swaging tool to form a double flange portion being bent forward, the board is pinched between the double flange portion and the flange portion, and then a bolt is screwed into the screw cylinder to hold and fix a plate-like part between the head of the bolt and the flange portion.

CITATION LIST

Patent Literature

Patent Literature 1: JP 11-31545 A (FIGS. 9 and 10)
Patent Literature 2: JP 5-33108 A (FIGS. 1 and 2)

SUMMARY OF INVENTION

Technical Problem

However, when the bolt is not provided in the connecting portion on the other end (when a nut of the terminal fitted with a nut is screwed with a bolt provided separately to connect the terminal to the connecting portion on the other end) in the terminal fitted with a nut (part fitted with a fastening member) described in Patent Literature 1, an operator has to screw the bolt and nut together while separately holding them in hand so that it has been inconvenient to perform a fastening work.

Moreover, according to a fastening structure (method) using the nut member made of the Al alloy described in Patent Literature 2, it is inconvenient to perform a compression/deformation work of the nut member since the swaging tool used exclusively for the work is required and, at the same time, the fastening workability is poor since the nut member and the bolt need to be handled separately in a manner that the plate-like part is fastened and fixed to the nut member by the bolt after the nut member is compressed and fixed to the vehicle body (panel).

The present invention has been made in consideration of the aforementioned circumstances, where an object of the preset invention is to provide a part fitted with a fastening member and a method of attaching the part by which the inconvenience of separately handling the nut member and the bolt member being the fastening members is resolved to be able to improve workability in fastening and fixing a part.

Solution to Problem

In order to achieve the aforementioned object, according to the present invention, there is provided a part fitted with a fastening member including: one fastening member that includes a high-rigidity screw portion, a low-rigidity crushable portion, and a locking portion provided against a member to which a part is attached; an other fastening member that includes a screw portion tightly screwed with the high-rigidity screw portion to be able to crush the crushable portion; and a part that is temporarily fastened and held between the one fastening member and the other fastening member while the two screw portions are loosely screwed together.

According to the aforementioned configuration, the part is integrated with the one fastening member (nut or bolt) and the other fastening member (bolt or nut) to be commercialized as the part fitted with a fastening member. The two fastening members are temporarily fastened together. A user inserts the crushable portion of the one fastening member into a hole of the member to which a part is attached and causes the other fastening member to be tightly screwed with the one fastening member to crush the crushable portion, whereby the one fastening member is fixed to the member to which a part is attached while at the same time the part is held and fixed between the member to which a part is attached and the other fastening member. The two fastening members are subjected to final fastening from the temporarily fastened state as described above, so that the inconvenience of an operator separately handling (such as holding by hand) the two fastening members is resolved, while at the same time the user need not prepare either one of the fastening members.

The part fitted with a fastening member according to the present invention is the part fitted with a fastening member as described above where the part is a terminal or a bracket.

When the part is the terminal, the aforementioned configuration allows the two fastening members to be assembled integrally to the terminal while an electric wire or the like is connected to the terminal. The terminal is fixed and ground-connected to a conductive metal member or the like to which a part is attached by the final fastening of the two fastening members. When the part is the bracket, the two fastening members are assembled integrally to the bracket while an electrical connection box or the like is integrated with the bracket. The bracket is fixed to a metal member or the like to which a part is attached by final fastening of the two fastening members.

A method of attaching a part fitted with a fastening member according to the present invention is a method of attaching the part fitted with a fastening member to the member to which a part is attached by tightly fastening the other fastening member and crushing the crushable portion while the crushable portion is inserted into a hole in the member to which a part is attached to prevent rotation of the one fastening member with respect to the member to which a part is attached with the locking portion.

According to the aforementioned configuration, the crushable portion of the one fastening member is inserted into a hole (through hole or bottomed hole) of the member to which a part is attached to cause the other fastening member to be tightly screwed with the one fastening member and crush the crushable portion, whereby the one fastening member is fixed to the member to which a part is attached while at the same time the part is held and fixed between the member to which a part is attached and the other fastening member. The two fastening members are subjected to final fastening from the temporarily fastened state as described above, so that the inconvenience of an operator separately handling (such as holding by hand) the two fastening members is resolved, while at the same time the user need not prepare either one of the fastening members.

Advantageous Effects of Invention

According to the present invention, the two fastening members, namely the nut member and the bolt member, are integrated with the part and delivered as a commodity or the like so that the inconvenience of a user separately handling each fastening member is resolved to be able to improve workability in fastening and fixing the part. Moreover, the user need not prepare either one of the fastening members, so that the load and cost on the user side can be reduced.

According to the present invention, when the part is the terminal, the terminal fitted with a fastening member can be connected to the member to which the terminal is attached with excellent workability and, when the part is the bracket, the bracket fitted with a fastening member can be fixed to the member to which the bracket is attached with excellent workability.

According to the present invention, workability in fastening and fixing the part to the member to which a part is attached can be improved, while at the same time a cost of the member to which a part is attached can be reduced since there is no need to provide in advance either one of the fastening members to the member to which a part is attached.

BRIEF DESCRIPTION OF DRAWINGS

FIG. 4 is a cross-sectional view illustrating a method of attaching the part fitted with a fastening member according to the first embodiment (where a part other than the principal part is illustrated in a side view).

FIG. 5 is a cross-sectional view illustrating a part fitted with a fastening member according to a second embodiment of the present invention (where a part other than a principal part is illustrated in a side view).

FIG. 6 is a cross-sectional view illustrating a method of attaching the part fitted with a fastening member according to the second embodiment (where a part other than the principal part is illustrated in a side view).

DESCRIPTION OF EMBODIMENTS

FIGS. 1 to 4 illustrate a part fitted with a fastening member and a method of attaching the part according to a first embodiment of the present invention.

Figure 1:
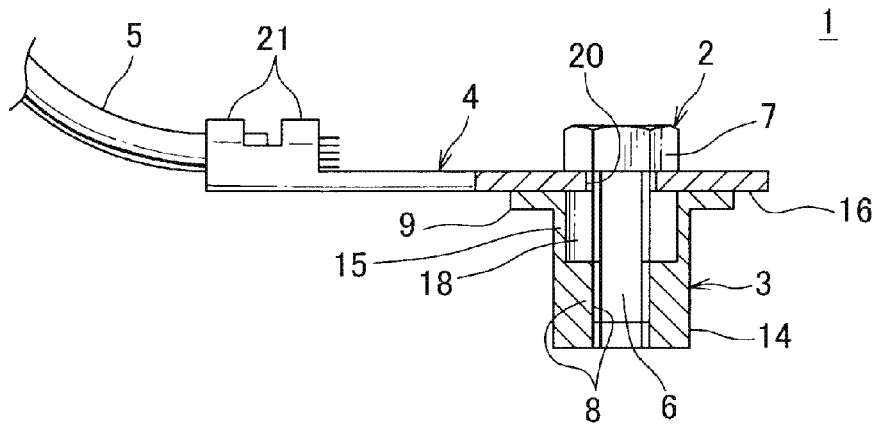
FIG. 1 is a cross-sectional view illustrating a part fitted with a fastening member according to a first embodiment of the present invention (where a part other than a principal part is illustrated in a side view).

As illustrated in FIG. 1, a part fitted with a fastening member 1 includes a bolt 2 and a crushable nut 3 that are fastening members made of conductive metal, and a conductive metal terminal 4 that is a part temporarily fastened and held between the bolt 2 and the crushable nut 3. An insulation coated electric wire 5 is crimp connected to the terminal 4 in advance. The part fitted with a fastening member 1 is delivered in this state from a parts manufacturer to an automaker, for example.

The bolt 2 is one that is commercially available and includes a male screw portion 6 and a head 7. While the male screw portion 6 is formed throughout the length of a shaft portion in this example, the length of the male screw portion 6 may be approximately the same as the length of a female screw portion 8 of the crushable nut 3. The same applies to each of the following embodiments.

Figure 2:
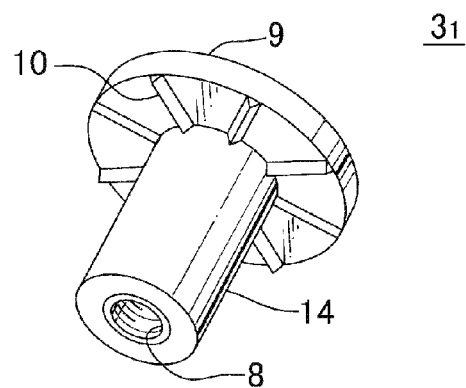
FIG. 2 is a perspective view illustrating an embodiment of a locking portion of a fastening member.
Figure 3:
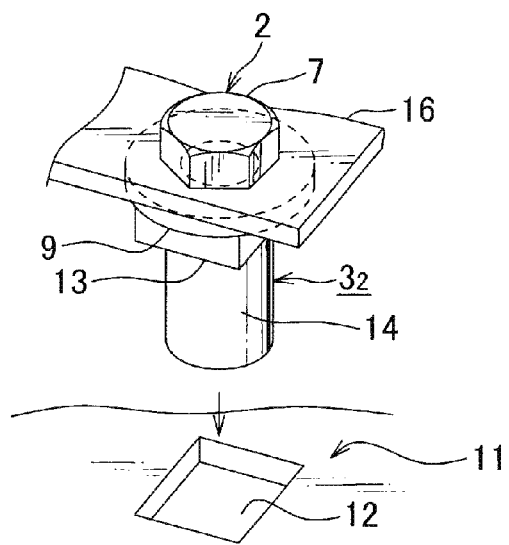
FIG. 3 is an exploded perspective view illustrating another embodiment of the locking portion of the fastening member.

The crushable nut 3 is similar to the nut member described in Patent Literature 2 where, as illustrated in an example of FIG. 2, a crushable nut 31 includes a plurality of locking blades 10 on a back surface of a flange portion 9 or, as illustrated in another example of FIG. 3, a crushable nut 32 includes a polygon portion 13 to be engaged in a polygonal hole 12 formed in a metal body panel (panel) 11 of a vehicle (and therefore the crushable nut is different from the nut member).

The plurality of blades 10 illustrated in FIG. 2 may instead be one blade. The shape of each of the polygonal hole 12 and the corresponding polygon portion 13 illustrated in FIG. 3 is not limited to a rectangle but may be set to have a triangle to an octagon as appropriate. These crushable nuts 3 are preferably made of an aluminum alloy or a copper alloy.

The blade 10 illustrated in FIG. 2 is adapted to bite into the surface of the body panel 11 and prevent the crushable nut 3 from co-rotating at the time of fastening the bolt 2 (FIG. 1) (when using a fastener such as an air wrench not shown to rotate the bolt head 7 while pressing it toward the body panel 11 (FIG. 4) of the vehicle), and is thus preferably sharp and may protrude at an angle in a direction of rotating/fastening the bolt 2 in order to enhance the biting.

The blade 10 may also be adapted to peel a coating on the surface of the body panel 11 while slightly rotating over the surface of the body panel 11 and bite into the surface of the body panel 11 in that state to be fixed. The blade 10 in FIG. 2 and the polygon portion 13 in FIG. 3 are generically called a locking portion. The screw portions 6 and 8 of the bolt 2 and the crushable nut 3 cannot be tightly screwed together without locking portions 10 and 13.

The polygon portion 13 in FIG. 3 is formed integrally between a nut body 14 having a circular cross section (columnar shape) and the circular flange portion 9. The nut body 14 itself can be formed into a polygon as well. The cross section of the nut body 14 is preferably circular in order to make a crushable portion 15 (FIG. 1) crush evenly in the nut body 14. The flange portion 13 is not necessary in the example of FIG. 3 (in which case a plate-like electrical contact portion 16 of the terminal 4 functions as the flange portion 13).

The locking portions 10 and 13 do not necessarily have to be formed as illustrated in the examples of FIGS. 2 and 3 but, for example, a protrusion (not shown) provided on a back surface of the flange portion 9 may be engaged with a small hole (not shown) of the body panel 11 (in which case the protrusion and the small hole correspond to the locking portions), or a protrusion (not shown) provided on the back surface of the flange portion 9 and an outer peripheral surface of the nut body 14 may be engaged with a notch groove (not shown) on a rim of a circular hole 17 (FIG. 4) formed in the body panel 11 (in which case the protrusion and the notch groove correspond to the locking portions).

Moreover, the circular nut body 14 can be press-fitted into the circular hole 17 in the body panel 11 to perform locking (in which case the outer peripheral surface of the nut body 14 corresponds to the locking portion). It may also be adapted to provide a blade (something similar to the blade 10 in FIG. 2) protruding in a vertical axis direction on the outer peripheral surface of the nut body 14 to press-fit the blade into the hole 17 and cause the blade to bite into the rim of the hole 17.

FIG. 1 illustrates the example where the flange portion 9 is integrally provided at an upper end of the nut body 14, the low-rigidity crushable portion 15, namely a thin outer peripheral wall (15) around a hollow portion 18, is provided from the flange portion 9 down to the middle of the nut body 14 in the axial direction, and the thick, high-rigidity female screw portion 8 is provided from the crushable portion 15 down to a lower end of the nut body 14. The female screw portion 8 refers to a thick peripheral wall having the shape of a helical female screw.

The terminal 4 is a pre-existing terminal formed of the electrical contact portion 16 having the shape of a rectangular plate or circular plate and including a circular hole 20 which is formed at the center or near the center of the electrical contact portion and through which a bolt is inserted, and an electric wire connection portion (crimp portion) 21 formed integrally and contiguously with the back side of the electrical contact portion 16. The bolt 2 is inserted into the hole 20 in the electrical contact portion 16 while the electric wire 5 is connected in advance to the electric wire connection portion 21, and the bolt 2 and the crushable nut 3 are loosely screwed together (fastened temporarily). The part fitted with a fastening member 1 is delivered in this state to an automaker.

Note that in addition to the crimp portion, a pressure welding portion, a welding portion or the like can be used as the electric wire connection portion 21 of the terminal 4 as appropriate. A washer (not shown) may be interposed between the bolt head 7 and the terminal 4 as well. The same applies to each of the following embodiments.

Once the part fitted with a fastening member 1 is delivered to the automaker, the nut body 14 is inserted into the hole 17 in the body panel (a member to which a part is attached) 11 as illustrated in FIG. 4 to tightly screw the screw portions 6 and 8 together (perform final fastening) by rotating the bolt 2 in a fastening direction (clockwise) with a fastener not shown while any of the locking portions (such as the portions 10, 12, or 13) is functioning, whereby a strong compression force toward the bolt head 7 acts on the crushable portion 15 of the nut body 14 and causes the crushable portion 15 to crush and protrude radially outward in the shape of a flange (the crushable portion being crushed is indicated with a reference numeral 15').

The body panel 11 is securely pinched between the crushed crushable portion 15' and the flange portion 9, while at the same time the electrical contact portion 16 of the terminal 4 is securely pinched between the flange portion 9 and the bolt head 7. As a result, a grounding connection of the terminal fitted with an electric wire 1 is securely made to the body panel 11 through the conductive flange portion 9. The blade 10 of the flange portion 9 illustrated in FIG. 2 peels the coating such as a coating film or an oxide film on the surface of the body panel 11 to realize satisfactory electrical contact (grounding).

According to the embodiment illustrated in FIGS. 1 to 4, the crushable nut 3 is delivered together with the bolt 2 and the terminal 4 in one piece to the automaker so that the automaker need not attach a weld nut to the body panel 11 of the vehicle but need only perform press work of the hole 17 on the body panel 11 into which the crushable nut 3 is inserted, whereby a cost of the body panel 11 (vehicle body) is reduced.

Moreover, the fastening operation of the bolt 2 can crush the crushable nut 3 when the terminal 4 is grounded to the body panel 11, whereby a conventional swaging tool and an operation thereof are not necessary and, at the same time, the bolt 2 is temporarily fixed to the crushable nut 3 in advance so that one need not support the crushable nut 3 and the bolt 2 by hand to thus be able to improve workability at the time of performing the grounding connection of the terminal 4 to the body panel 11.

FIGS. 5 and 6 illustrate a part fitted with a fastening member and a method of attaching the part according to a second embodiment of the present invention.

As illustrated in FIG. 5, a part fitted with a fastening member 23 includes a nut 24 and a crushable bolt 25 that are fastening members made of conductive metal, and a conductive metal terminal 4 that is a part temporarily fastened and held between the nut 24 and the crushable bolt 25. An electric wire 5 is connected (crimped) to the terminal 4 in advance, and the part fitted with a fastening member 23 is delivered in an assembled state illustrated in FIG. 5 from a parts manufacturer to an automaker.

The nut 24 is one that is commercially available. The crushable bolt 25 is similar to a commercially available HB bolt but is different therefrom in that a blade (locking portion) 10 similar to the one in the example illustrated in FIG. 2 is provided on a back surface (bottom surface) of an upper end flange portion 26 and that a polygon portion (locking portion) 13 similar to the one in the example illustrated in FIG. 3 and engaged with a polygonal hole 12 in a body panel 11 is provided to a thin cylindrical, low-rigidity crushable portion 27 contiguous with the bottom of the flange portion 26 (the locking portion is not shown in FIGS. 5 and 6). In addition to what is illustrated in FIGS. 2 and 3, the locking portion may also have the form described above (such as the protrusion and small hole, the protrusion and notch groove, or the press-fitted outer peripheral surface).

The crushable bolt 25 includes a high-rigidity male screw portion (bolt body) 28 being a bolt shaft oriented upward, a high-rigidity bolt head 29 provided at the bottom of the male screw portion 28, the low-rigidity crushable portion 27 having the thin cylindrical (peripheral wall) shape, formed radially outside the male screw portion 28 concentrically therewith, and formed integrally from the bolt head 29 down to the middle of the male screw portion 28 in the shaft direction, the flange portion 26 provided integrally with an upper end of the crushable portion 27, and the locking portion (refer to FIGS. 2 and 3, for example). An annular hollow portion (void) 30 is formed between the crushable portion 27 and the male screw portion 28. It is preferable that the crushable bolt 25 is integrally formed of an aluminum alloy or a copper alloy.

A top surface (front surface) of the flange portion 26 is in contact with a bottom surface (back surface) of a plate-like electrical contact portion 16 of the terminal 4, and the male screw portion 28 is inserted through a hole 20 of the electrical contact portion 16 upward so that the male screw portion 28 and a female screw portion 31 of the nut 24 are loosely screwed together (temporarily fastened) on the top surface (front surface) side of the electrical contact portion 16.

As illustrated in FIG. 6, the nut 24 is rotated in a fastening direction (clockwise) with a fastener such as a nut runner to tightly screw the screw portions 28 and 31 together while the crushable portion (thin cylindrical portion) 27 of the crushable bolt 25 of the part fitted with a fastening member 23 is inserted through a hole 17 in the body panel (member to which a part is attached) 11, whereby the crushable portion 27 of the crushable bolt 25 is compressed in the shaft direction toward the nut 24 and crushes into the shape of a flange while the locking portion (refer to FIGS. 2 and 3, for example) is functioning so that the body panel 11 is securely pinched between a crushable portion 27' being crushed and the flange portion 26 and, at the same time, the electrical contact portion 16 of the terminal 4 is securely pinched between the flange portion 26 and the nut 24 to be able to securely perform a grounding connection of the terminal 4 to the body panel 11.

When the blade 10 as illustrated in FIG. 2 is formed on the back surface (bottom surface) of the flange portion 26 as the locking portion, the fastener such as the nut runner is used to press the nut 24 and the blade 10 formed on the bottom surface of the flange portion 26 against the front surface (top surface) of the body panel 11 to allow the blade 10 to securely bite into the surface of the body panel 11 and perform locking as well as peeling of a coating on the body panel 11. The fastener such as the nut runner need not be pressed when there are provided the polygonal hole 12 as illustrated in FIG. 3 in the body panel 11 and the polygon portion 13 (FIG. 3) at the top of the crushable portion 27 of the crushable bolt 25.

According to the embodiment illustrated in FIGS. 5 and 6, the crushable bolt 25 is delivered together with the nut 24 and the terminal 4 in one piece to the automaker so that the automaker need not attach a weld nut to the body panel 11 of a vehicle but need only perform press work of the hole 17 on the body panel 11 into which the crushable bolt 25 is inserted, whereby a cost of the body panel 11 (vehicle body) is reduced.

Moreover, the fastening operation of the nut 24 can crush the crushable bolt 25 when the terminal 4 is grounded to the body panel 11, whereby a conventional swaging tool and an operation thereof are not necessary and, at the same time, the nut 24 is temporarily fixed to the crushable bolt 25 in advance so that one need not support the crushable bolt 25 and the nut 24 by hand to thus be able to improve workability at the time of performing the grounding connection of the terminal 4 to the body panel 11.

Figure 7:
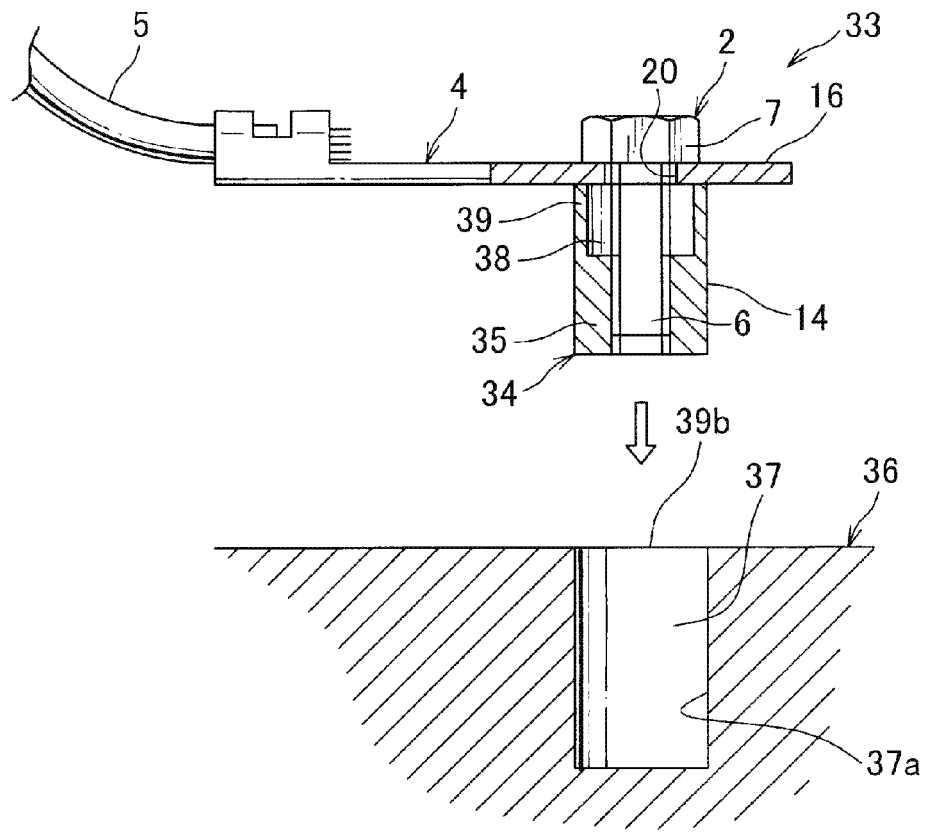
FIG. 7 is a cross-sectional view illustrating a part fitted with a fastening member and a method of attaching the part (illustrating a state before attachment) according to a third embodiment of the present invention (where a part other than a principal part is illustrated in a side view).
Figure 8:
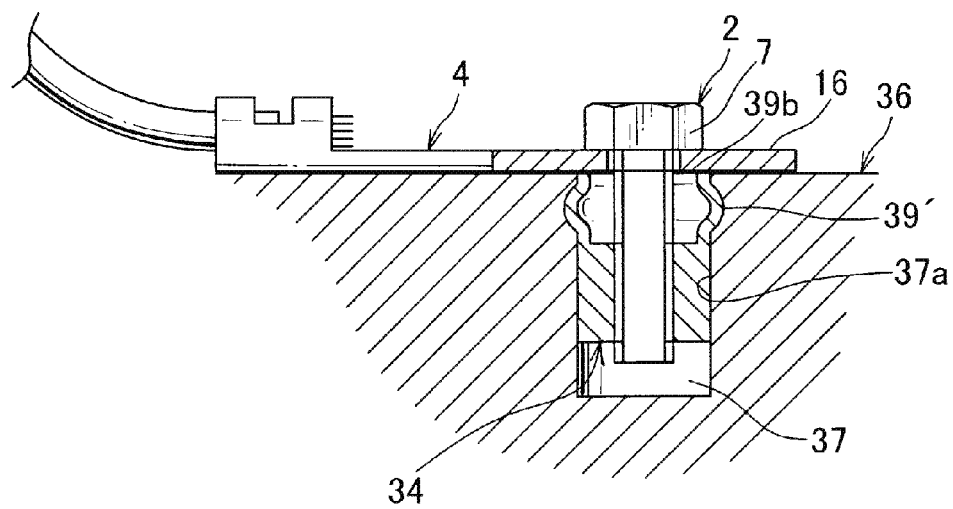
FIG. 8 is a cross-sectional view illustrating the part fitted with a fastening member and the method of attaching the part according to the third embodiment (where a part other than the principal part is illustrated in a side view).

FIGS. 7 and 8 illustrate a part fitted with a fastening member and a method of attaching the part according to a third embodiment of the present invention.

As illustrated in FIG. 7, a part fitted with a fastening member 33 includes a bolt 2 and a crushable nut 34 that are fastening members made of conductive metal, and a conductive metal terminal 4 that is a part temporarily fastened and held between the bolt 2 and the crushable nut 34. An electric wire 5 is crimp connected to the terminal 4 in advance.

A male screw portion 6 of the bolt 2 is inserted into a hole 20 of a plate-like electrical contact portion 16 of the terminal 4 so that a bolt head 7 is brought into contact with a front surface (top surface) of the electrical contact portion 16, the male screw portion 6 is loosely and temporarily screwed into a female screw portion 35 of the crushable nut 34 at a back surface (bottom surface) side of the electrical contact portion 16, and an upper end of the crushable nut 34 is in contact with the back surface (bottom surface) of the electrical contact portion 16. The part fitted with a fastening member 33 is delivered in a state illustrated in FIG. 7 from a parts manufacturer to an automaker. The crushable nut 34 is preferably made of an aluminum alloy or a copper alloy.

In the automaker, a deep hole 37 with a bottom and a circular cross section is provided to a conductive metal engine block (member to which a part is attached) 36. The hole 37 is a little deeper than the overall length of the crushable nut 34, while an inner diameter of the hole 37 is specified to be slightly larger than an outer diameter of the crushable nut 34. Note that when the hole (37) passing through the engine block 36 is provided, the hole (37) can have a polygonal cross section as well.

The crushable nut 34 is similar to the crushable nut 3 of the example illustrated in FIG. 1 from which the flange portion 9 is removed to be left with only the nut body 14, and is formed of a thick, high-rigidity female screw portion 35 formed at a lower part of the nut and a thin, hollow (space is indicated with a reference numeral 38) and low-rigidity crushable portion 39 formed at an upper part of the nut.

As a locking portion of the crushable nut 34, one or a plurality of blades is provided in a vertical axis direction on an outer peripheral surface of the nut body 14 (refer to the blade 10 in FIG. 2 for the shape of the blade), for example, where the blade (10) is press-fitted into an inner peripheral surface of the hole 37 and bites into an inner peripheral surface 37a of the hole 37 to prevent the crushable nut 34 from co-rotating in a circumferential direction.

When the flange portion 9 is provided at an upper end of the nut body 14 as with the example in FIG. 1, one or a plurality of blades 10 (FIG. 2) is provided on a back surface of the flange portion 9 so that the bolt 2 is pressed downward with a fastener such as an air wrench to cause the blade 10 to bite into a front surface (top surface) of the engine block 36. When the hole 37 has a polygonal shape, the nut body 14 having a polygonal shape is inserted into the hole 37 to perform locking.

As illustrated in FIG. 8, the screw portions 6 and 35 are tightly screwed together and fastened by rotating the bolt 2 clockwise while rotation of the crushable nut 34 with respect to the hole 37 is prevented by any of the locking portions above, whereby the crushable portion 39 of the crushable nut 34 protrudes radially outward in the shape of a flange while being crushed in the axial direction (the protruding crushable portion is indicated with a reference numeral 39') to strongly press the inner peripheral surface 37a of the hole 37 radially outward so that the crushable nut 34 is tightly fixed in the hole 37 by the pressing force.

The crushable portion 39' is located in the vicinity of an opening 39b of the hole 37. The inner diameter of the hole 37 does not expand although the crushable portion 39' protrudes larger than the inner diameter of the hole 37 in FIG. 8 for convenience of description.

The electrical contact portion 16 of the terminal 4 is grounded while pressed against the surface of the engine block 36 by the head 7 of the bolt 2. The terminal 4 is in electrical contact with the inner surface 37a of the hole 37 in the engine block 36 through the bolt 2 and the crushable nut 34 where, particularly when the crushable portion 39 crushes and protrudes radially to be strongly pressed and brought into contact with the inner surface 37a of the hole 37, an oxide film or the like on the inner surface 37a of the hole 37 is destroyed to have enhanced grounding connection.

Note that in the embodiment illustrated in FIGS. 7 and 8, the terminal 4 can be fixed and connected to the engine block 36 in the same manner by using the nut 24 and the crushable bolt 25 illustrated in FIGS. 5 and 6. In this case, the crushable bolt 25 is inserted into the hole 37, the male screw portion 28 (FIG. 5) passing through the terminal 4 and protruding upward is screwed into the nut 24 (FIG. 5) on the top surface side of the terminal 4, and the crushable portion 27 of the crushable bolt 25 is pressed to be brought into contact with the inner surface 37a of the hole 37 (FIG. 8).

According to the embodiment illustrated in FIGS. 7 and 8, the crushable nut 34 is delivered together with the bolt 2 and the terminal 4 in one piece to the automaker so that the automaker need not provide a female screw hole to the engine block 36 of a vehicle but need only perform drill work of the hole 37 on the engine block 36 into which the crushable nut 34 is inserted, whereby a cost of the engine block 36 is reduced.

Moreover, the fastening operation of the bolt 2 can crush the crushable nut 34 when the terminal 4 is grounded to the engine block 36, whereby a conventional swaging tool and an operation thereof are not necessary and, at the same time, the bolt 2 is temporarily fixed to the crushable nut 34 in advance so that one need not support the crushable nut 34 and the bolt 2 by hand to thus be able to improve workability at the time of performing the grounding connection of the terminal 4 to the engine block 36.

Figure 9A:
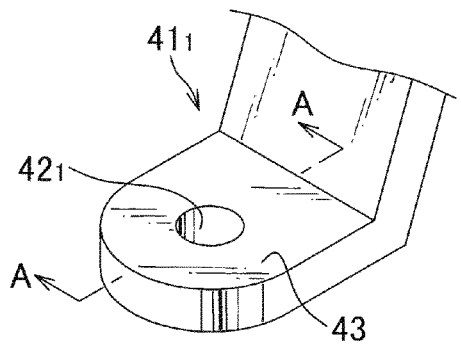
FIGS. 9A and 9B are perspective views each illustrating an example of a part according to another embodiment.
Figure 9B:
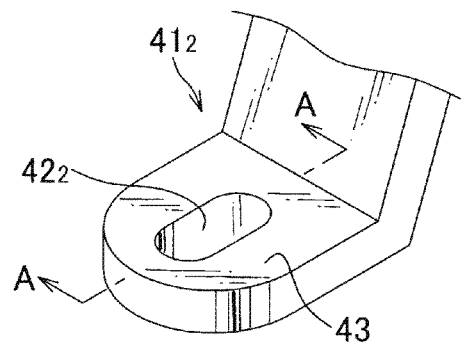
Figure 10:
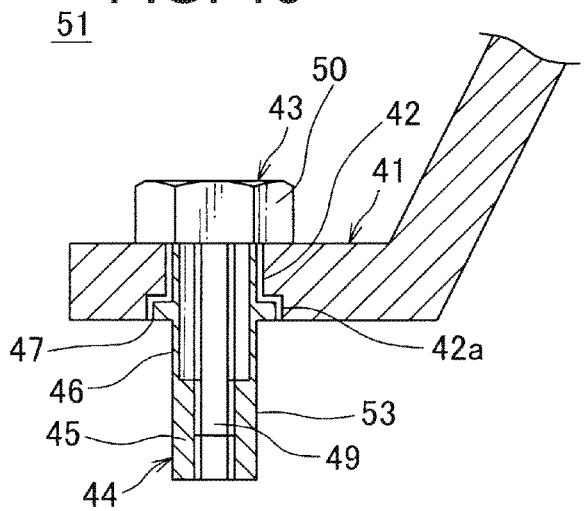
FIG. 10 is a cross-sectional view taken along line A-A of FIGS. 9A and 9B and illustrating a part fitted with a fastening member according to a fourth embodiment.
Figure 11:
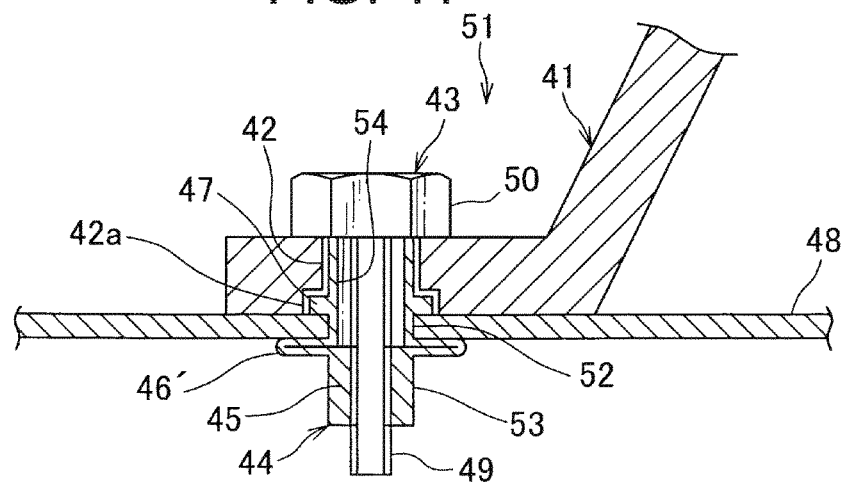
FIG. 11 is a cross-sectional view illustrating a method of attaching the part fitted with a fastening member according to the fourth embodiment.

FIGS. 9 to 11 illustrate a part fitted with a fastening member and a method of attaching the part according to a fourth embodiment of the present invention.

As illustrated in FIGS. 9A and 9B, for example, a bracket 41 of an electrical connection box (not shown) is used as a part instead of a terminal. The bracket 41 may be molded integrally with the electrical connection box with a resin or provided separately to be attached to the electrical connection box. In either case, the bracket 41 is made of synthetic resin.

A bracket $41_1$ illustrated in FIG. 9A includes a plate 43 and a circular hole $42_1$ provided in the plate 43, whereas a bracket $41_2$ illustrated in FIG. 9B includes the plate 43 and an elliptical hole $42_2$ provided in the plate 43. A fastening member to be described can be applied to the either bracket 41.

As illustrated in FIG. 10, the hole 42 of the bracket 41 includes a large diameter portion 42a that is a size larger than the hole and provided at a bottom end thereof. The fastening member is formed of a metal bolt 43 and a metal crushable nut 44. The bracket 41 is temporarily fastened and held between the bolt 43 and the crushable nut 44. The bolt 43 and the nut 44 need not be conductive. The bolt 43 is one that is commercially available.

The crushable nut 44 includes a thick, high-rigidity female screw portion 45 formed at a lower part of the nut and having a circular annular cross section, a thin, low-rigidity crushable portion 46 formed at an upper part of the nut in the shape of a hollow cylinder, an outward flange portion 47 provided at a middle of the crushable portion 46 in an axial direction, and a locking portion formed of one or a plurality of blades (refer to the blade 10 in FIG. 2) provided on a back surface (bottom surface) of the flange portion 47, for example. The female screw portion 45 and the crushable portion 46 make up a nut body 53.

The flange portion 47 is engaged with the large diameter portion 42a of the hole 42 in the bracket 41. The flange portion 47 and the large diameter portion 42a of the hole 42 can also be formed into polygonal shapes to serve as the locking portion. In such case, however, a strong rotational force generated at the time of fastening the bolt acts on the bracket 41 made of synthetic resin so that it is preferable to provide the blade 10 or the like to a metal body panel 48 (FIG. 11) to prevent rotation. In addition to the form described above, the locking portion can have the various forms as described in the examples in FIGS. 1 to 4 (such as the protrusion in the crushable nut 3 and the notch groove in the panel 11, and the blade on the outer peripheral surface of the crushable nut 3).

A top portion of the crushable nut 44 is inserted from below into the hole 42 of the bracket 41 to cause the flange portion 47 to be in contact with a top surface of the large diameter portion 42a and stop (the flange portion 47 acting as a stopper), and a male screw portion 49 of the bolt 43 is screwed into the female screw portion 45 of the crushable nut 44 from above to achieve loose temporary fastening and bring a bolt head 50 into contact with a top surface of the bracket 41. The electrical connection box is delivered in this state, namely a state where a bracket (part) 51 is fitted with a fastening member, from a parts manufacturer to an automaker.

In the automaker, as illustrated in FIG. 11, the nut body 53 of the crushable nut 44 is inserted into a hole 52 in the body panel (member to which a part is attached) 48, then the bolt 43 is turned clockwise with a fastener to tightly screw and fasten the screw portions 45 and 49 together so that the crushable portion 46 of the crushable nut 44 is compressed and crushes in the axial direction toward the bolt head 50 to protrude outward in the shape of a flange, the body panel 48 is pinched between a crushable portion 46' being crushed and the flange portion 47, and the bracket 41 is pinched and fixed between the body panel 48 and the bolt head 50. As a result, the electrical connection box is fixed (attached) to the body panel 48.

A part corresponding to the crushable nut (a thin upper portion 54 of the nut body 53 and the flange portion 47) disposed inside the hole 42 of the bracket 41 between the bolt head 50 and the body panel 48 is made as a metal collar to prevent the bracket 41 from being crushed at the time of fastening the screw. A washer may be interposed between the bolt head 50 and the bracket 41 as well. Something other than the electrical connection box can also be used as the bracket 41.

According to the embodiment illustrated in FIGS. 10 and 11, the crushable nut 44 is delivered together with the bolt 43 and the bracket 41 (electrical connection box) in one piece to the automaker so that the automaker need not attach a weld nut to the body panel 48 of a vehicle but need only perform press work of the hole 52 on the body panel 48 into which the crushable nut 44 is inserted, whereby a cost of the body panel 48 (vehicle body) is reduced.

Moreover, the fastening operation of the bolt 43 can crush the crushable nut 44 when the bracket 41 is fixed to the body panel 48, whereby a conventional swaging tool and an operation thereof are not necessary and, at the same time, the bolt 43 is temporarily fixed to the crushable nut 44 in advance so that one need not support the crushable nut 44 and the bolt 43 by hand to thus be able to improve workability at the time of fixing the bracket 41 to the body panel 48.

Furthermore, the crushable nut portion 54 between the bolt head 43 and the body panel 48 acts as the metal collar to prevent the bracket 41 from being crushed at the time of fastening the screw, while at the same time a conventional metal collar is not required so that the number of parts is reduced to be able to reduce a cost of the bracket 41.

Note that instead of the fixing structure of the bracket 41 illustrated in FIGS. 10 and 11, there can be applied a structure in which the crushable nut 44 or the crushable bolt 25 (refer to FIG. 5) is inserted into the bottomed hole 37 of a block (not limited to the engine block 36) illustrated in FIGS. 7 and 8 to fix the bracket by fastening.

Moreover, instead of the bracket 41 made of synthetic resin, there can be used various parts such as a metal plate bracket (one that fixes a connector to the panel 48, for example), a thin plate bracket made of synthetic resin (one that fixes a harness protector to the panel 48, for example), or another block-shaped part.

INDUSTRIAL APPLICABILITY

The part fitted with a fastening member and the method of attaching the part according to the present invention can be used to resolve the inconvenience of separately handling the nut member and the bolt member and improve workability in fastening and fixing the part.

REFERENCE SIGNS LIST

1, 23, 33, 51 Part (Component) fitted with a fastening member
2, 24, 43 Another fastening member
3, 25, 34, 44 One fastening member
4 Terminal (part/component)
6, 31, 49 Screw portion
8, 28, 35, 45 Screw portion
10, 13 Locking portion
11, 48 Body panel (member to which a part is attached)
15, 27, 39, 46 Crushable portion
17, 37, 52 Hole
36 Engine block (member to which a part is attached)
41 Bracket (part,component)

The invention claimed is:

1. A part fitted with a fastening member and attached to a mounting component, comprising:
   one fastening member that includes a high-rigidity screw portion, a low-rigidity crushable portion, and a locking portion provided against the mounting component;
   an other fastening member that includes a screw portion tightly screwed with the high-rigidity screw portion to be able to crush the crushable portion; and
   the part that is temporarily fastened and held between the one fastening member and the other fastening member while the two screw portions are loosely screwed together.

2. The part fitted with a fastening member and attached to a mounting component according to claim 1, wherein the part is a terminal or a bracket.

3. A method of attaching a part fitted with a fastening member and attached to a mounting component, the method being employed to attach the part fitted with the fastening member according to claim 2 to the mounting component,
   wherein the other fastening member is tightly fastened to crush the crushable portion while the crushable portion is inserted into a hole in the mounting component so as to prevent rotation of the one fastening member by means of the locking portion, with respect to the mounting component.

4. A method of attaching a part fitted with a fastening member and attached to a mounting component, the method being employed to attach the part fitted with the fastening member according to claim 1 to the mounting,
   wherein the other fastening member is tightly fastened to crush the crushable portion while the crushable portion is inserted into a hole in the mounting component so as to prevent rotation of the one fastening member by means of the locking portion, with respect to the mounting component.

* * * * *